Sept. 2, 1952 — R. FORMAN — 2,608,996
GLASS VALVE
Filed Aug. 30, 1951 — 2 SHEETS—SHEET 1

VACUUM

VACUUM

INVENTOR.
Ralph Forman
BY
Max L. Libman
ATTORNEY

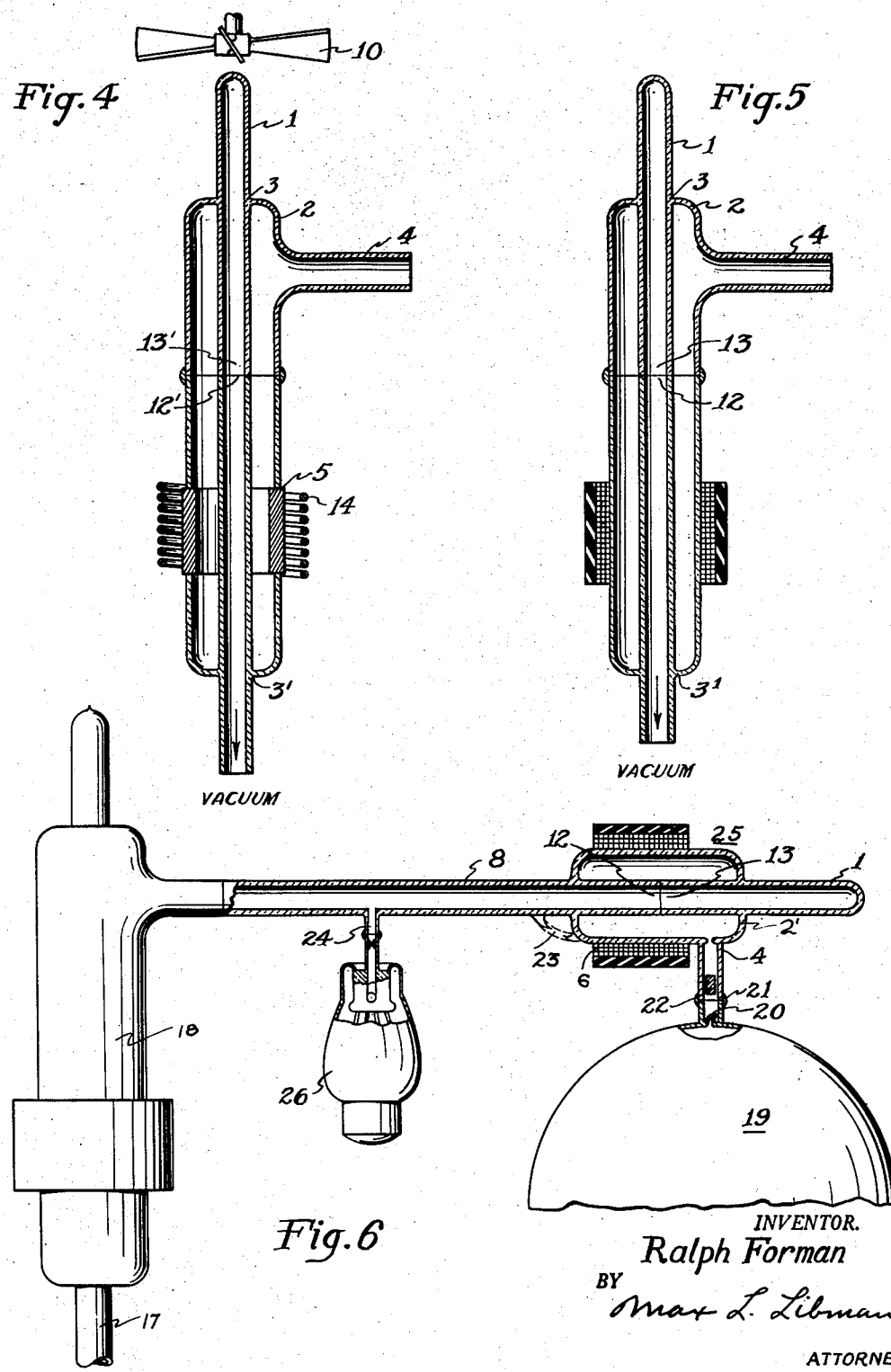

Patented Sept. 2, 1952

2,608,996

UNITED STATES PATENT OFFICE 2,608,996

GLASS VALVE

Ralph Forman, Hyattsville, Md., assignor to the United States of America as represented by the Secretary of Commerce Application August 30, 1951, Serial No. 244,448

9 Claims. (Cl. 137—638)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of March 3, as amended (45 Stat. 467; 35 U. S. C. 45).

This invention relates to the development of a glass valve and more particularly to a valve used to accurately control the gas flow into or through a high vacuum system.

In the manufacture of gas-filled electron tubes some form of valve must be used to accurately control the flow of gas into the tube which is to be filled with gas after evacuation.

A normal petcock type of valve is unsuitable for this purpose when high accuracy is required because the degassing of metal requires high temperatures, and the grease seal which is used in such valves is destroyed by the application of heat. Also the heated grease will contaminate the gas.

The object of this invention is to provide a reliable and accurate glass valve for control of vacuum systems requiring the highest degree of control.

Another object is to provide a glass valve that can be used in systems having pressures as low as $10^{-6}$ millimeters of mercury.

Another object of this invention is to provide a simple valve for accuracy controlling the gas pressures in gas-filled electron tubes.

In accordance with the present invention there is provided a valve that has the appearance of a water condenser with but one side arm. One end of the center tube is sealed and the other end is connected into the system to be controlled. The center tube is cut in half and the two faces thus formed are optically ground and form the valve seal. A Kovar sleeve, in the preferred form of the invention, is inserted in the outer tube and a heater coil is wound around this insert. When current passes through the coil the Kovar conducts heat from the winding, and this heat causes the Kovar to expand. This increases the length of the outer tube, unseats the optically ground surfaces of the inner tube and thereby opens the valve. When the current is removed the Kovar cools and contracts, thereby closing the valve.

Other uses and advantages of the invention will become apparent upon reference to the specification and drawings.

Figure 4 shows a longitudinal cross section of a modification of the valve used for higher speed operation.

Figure 5 shows a longitudinal cross section of another modification of the invention.

Figure 6 shows a vacuum and gassing system incorporating the valve of the present invention.

Figure 1:
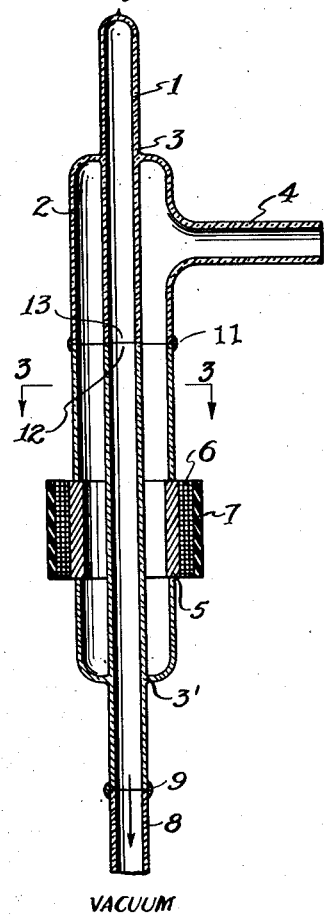
Figure 1 shows a longitudinal cross section of the valve in the closed position.
Figure 3:
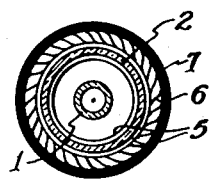
Figure 3 shows a transverse cross section of the valve taken on line 3—3 of Figure 1.

Referring now to Figures 1 and 3 which show the preferred embodiment of the invention, a piece of tube 1 of convenient diameter, such as ¼ inch, is closed at one end and is sealed into a larger tube 2 of convenient diameter, such as ¾ inch, seals being provided at 3 and 3' by means of glass welding or a similar operation. An inlet 4 is welded to tube 2. A metal sleeve 5 is welded into the tube 2, as shown, such metal being Kovar or other material which has a thermal expansion approximately equal to that of glass to avoid cracking the glass or breaking the weld when heat is applied to the sleeve 5.

It is possible to use a metal sleeve with a more rapid rate of thermal expansion than glass if this metal sleeve is not joined to the glass directly but is brazed to a Kovar ring on each end, then the Kovar rings welded to the glass. A resistance winding 6 is wound around and suitably electrically insulated from the sleeve 5, and is protected by an insulating winding 7. A continuation 8 of the tube 1 is welded on at 9 to connect the valve to the vacuum system. A saw cut is made through the assembled tubes 1 and 2 at 11, and the annular surfaces 12 and 13, which result from the cut of the tube 1, are optically polished. The tube 2 is then welded together at 11, bringing the optical surfaces 12 and 13 into close gas-tight contact. The tightness of the seal is also due in part to the intermolecular attraction between the two surfaces.

Figure 2:
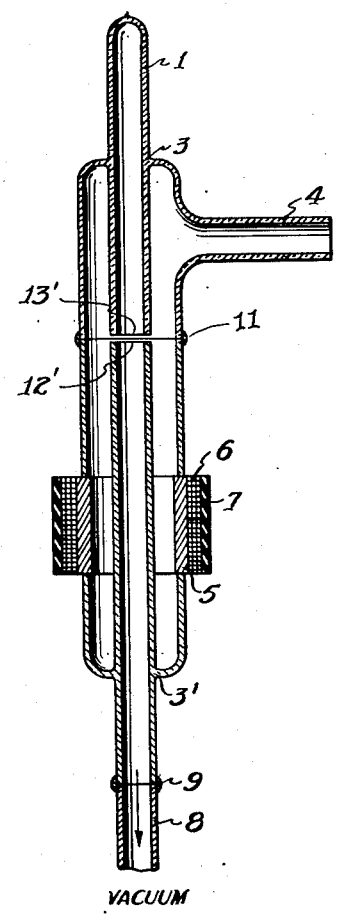
Figure 2 shows a longitudinal cross section of the valve in the open position.

Referring now to Figure 2, when current is passed through winding 6, heat is generated in the winding and is transferred to sleeve 5, causing said sleeve to expand. Expansion of sleeve 3 causes elongation of tube 2 and thus causes surfaces 12 and 13 to be withdrawn from each other, affording an aperture through which gas may be admitted into tube 1 from inlet 4, as will be described in connection with Figure 6.

Figure 4 shows a variation of my device, in which coil 6 and insulation 7 are omitted, and instead of the conducted and radiant heat provided by such coil, an induction heating system provided from coil 4 is utilized. A fan 10 may also be provided in order that a draft of air may be caused to flow over tube 2 and, more particularly, sleeve 5, in order to expedite the cooling of said tube and sleeve so that surfaces 12 and 13 may be brought together more rapidly when gas shut off is desired.

Figure 5 shows another modification of the glass valve. In this modification the metal sleeve is omitted and the electric heating coil is wrapped around the glass. This applies the heat directly to the glass rather than to the metal. This particular modification is simpler to manufacture than those types with the metal inserts and is useful where the opening between 12 and 13 is to be small and therefore only small quantities of heat need be conducted to the glass. However, when large amounts of heat are required the metal inserts are preferred because of their better heat conductivity.

Figure 6 shows the valve of the present invention used in two places in a tube evacuation and gassing system. The system is connected to a vacuum pump (not shown) through the tube 17 and the glass valve 18. A gas container 19 provided with a projection 20 is sealed by means of weld 21 to inlet tube 4 of the valve 25, a weight 22 being provided within tube 4 to permit breaking of projection 20 when desired. A connecting tube 23 from tube 2' to tube 8 is sealed off, as shown, after degassing of the chamber between tubes 1 and 2'. Additional connection 24 is provided to tube 8 to connect the electron tube 26, which is to be gassed. In operation, after the system has been degassed, the vacuum pump connected to 17 is operated to evacuate the entire system shown. The glass valve 18 is then closed and the system is agitated to cause weight 22 to break projection 20, permitting gas to flow into the chamber formed by tube 2'. Current is then passed through winding 6, causing tube 2' to expand, thus causing surfaces 12 and 13 of tube 1 to draw apart, and permitting gas to enter tube 1 and flow through 8 and 24 into electron tube 26. Tube 26 may then be sealed off, and the operation thus completed.

This valve has also found use as a standard leak for calibrating leak detectors and as a safety valve for sealing vacuum systems when the pumps stop because of a power failure. This valve is particularly useful in sealing vacuum systems, since leakage through the valve has been found to be approximately 0.005 liter-micron per hour; that is, the increase in pressure inside of a one-liter evacuated container due to leakage through the valve amounted to $0.005 \times 10^{-3}$ millimeter of mercury per hour.

It will be apparent that the embodiments shown are only exemplary and that various modifications can be made in construction and arrangement within the scope of my invention as defined in the appended claims.

I claim:

1. A valve comprising a first tube sealed at one end and having an optically ground surface at the other end, a second tube with both ends open and one of said ends being optically ground, said first and second tubes being so arranged that the optically ground surfaces are normally in contact with each other, mechanical means for holding said optically ground surfaces in firm contact and thermal means for elongating said mechanical means so as to pull apart said optically ground surfaces.

2. A glass valve for use in systems with pressures in the order of $10^{-6}$ millimeters of mercury, comprising a first tube sealed at one end and open at the other end, the open end of said first tube having an optically ground surface, a second tube of the same diameter as said first tube with both ends open, one of said open ends having an optically ground surface, said first and second tubes arranged coaxially and with said optically ground surfaces normally in contact, a third tube of larger diameter than said first and second tubes, said third tube arranged concentrically with respect to said first and second tubes and extending from between the two ends of said first tube to a point between the two ends of said second tube, one end of said third tube being sealed to said first tube and the other end of said third tube being sealed to said second tube, an opening in the side of said third tube, and means for increasing the length of said third tube so as to pull the two optically ground surfaces apart.

3. The invention according to claim 2 in which said tubes are made of glass.

4. The invention according to claim 2 in which said last-mentioned means is a thermal means.

5. The invention according to claim 2 in which said last-mentioned means comprises a metal insert in said third tube and an electric heating coil wound around said metal insert.

6. The invention according to claim 5 in which said metal is Kovar.

7. The invention according to claim 2 in which said last-mentioned means is an electric heating coil wound around a section of said third tube.

8. The invention according to claim 2 in which said last-mentioned means comprises a metal insert in said third tube and an induction heating coil associated with the metal insert.

9. The invention according to claim 8 in which said metal is Kovar.

RALPH FORMAN.

No references cited.